US012694222B2

(12) United States Patent
Shlomov et al.

(10) Patent No.: US 12,694,222 B2
(45) Date of Patent: Jul. 28, 2026

(54) USER INTERFACE AUTOMATION USING NATURAL LANGUAGE

(71) Applicant: INTERNATIONAL BUSINESS MACHINES CORPORATION, Armonk, NY (US)

(72) Inventors: Segev Shlomov, Haifa (IL); Asaf Adi, Kiryat Ata (IL); Offer Akrabi, Lehavot Habashan (IL); Orit Davidovich, Kiryat Tivon (IL); Sami Marreed, Kafer Kanna (IL); Nir Mashkif, Geva Carmel (IL); Alon Oved, Haifa (IL); Aviad Sela, Yokneam (IL); Avi Yaeli, Haifa (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 18/632,256

(22) Filed: Apr. 10, 2024

(65) Prior Publication Data

US 2025/0322169 A1 Oct. 16, 2025

(51) Int. Cl.
| | |
|---|---|
| *G06F 40/30* | (2020.01) |
| *G06F 3/0487* | (2013.01) |
| *G06F 16/242* | (2019.01) |
| *G06F 40/56* | (2020.01) |

(52) U.S. Cl.
CPC ............ *G06F 40/30* (2020.01); *G06F 3/0487* (2013.01); *G06F 16/243* (2019.01); *G06F 40/56* (2020.01)

(58) Field of Classification Search
CPC .... G06F 3/0487; G06F 16/243; G06F 40/137; G06F 40/30; G06F 40/35; G06F 40/56; G06V 20/44

USPC .............................................. 704/9
See application file for complete search history.

(56) References Cited

U.S. PATENT DOCUMENTS

| | | | | |
|---|---|---|---|---|
| 11,442,749 | B2 * | 9/2022 | Magureanu | ......... G06F 3/04847 |
| 11,908,476 | B1 * | 2/2024 | Lyu | ......................... G06F 3/167 |
| 12,124,806 | B2 * | 10/2024 | Mayer | .................... G06N 3/045 |
| 12,387,036 | B1 * | 8/2025 | Elsen | .................... G06V 10/803 |
| 2021/0342738 | A1 * | 11/2021 | Sarferaz | ................. G06Q 10/10 |
| 2023/0146421 | A1 | 5/2023 | Wilson | |
| 2023/0419161 | A1 * | 12/2023 | Dines | .................... G06F 40/174 |
| 2024/0045780 | A1 * | 2/2024 | Aziz | .................... G06Q 30/015 |
| 2024/0303418 | A1 * | 9/2024 | Daniel | .................. G06F 40/174 |
| 2024/0403328 | A1 * | 12/2024 | Hecht | .................. G06F 16/285 |

(Continued)

OTHER PUBLICATIONS

Gao, Difei, et al. "Assistgui: Task-oriented desktop graphical user interface automation." arXiv preprint arXiv:2312.13108, Jan. 2024, pp. 1-14. (Year: 2024).*

(Continued)

*Primary Examiner* — James S Wozniak
(74) *Attorney, Agent, or Firm* — CHIP LAW GROUP

(57) ABSTRACT

A method and system of UI automation includes receiving a demonstration of an automation to be performed on an application. One or more objects and one or more corresponding labels associated with the demonstration are detected on the application. The demonstration is transformed into one or more natural language instructions. An object is semantically selected during a runtime action based on a large language model (LLM). The semantic selection is reflective of an intention captured in the natural language instruction despite any change in a corresponding label of the object.

16 Claims, 9 Drawing Sheets

(56) References Cited

U.S. PATENT DOCUMENTS

| | | | |
|---|---|---|---|
| 2025/0037836 A1* | 1/2025 | Kiani | G16H 10/60 |
| 2025/0094708 A1* | 3/2025 | Cunningham | G06F 40/30 |
| 2025/0131185 A1* | 4/2025 | Jain | G06Q 10/0633 |
| 2025/0165775 A1* | 5/2025 | Sathianathan | G06N 3/08 |
| 2025/0166377 A1* | 5/2025 | Wang | G06V 10/82 |
| 2025/0200475 A1* | 6/2025 | Zhang | G06F 8/30 |
| 2025/0200489 A1* | 6/2025 | Ghoche | G06Q 10/067 |
| 2025/0231947 A1* | 7/2025 | Files | G06F 16/24568 |
| 2025/0265522 A1* | 8/2025 | Jagmohan | G06F 40/20 |
| 2025/0300939 A1* | 9/2025 | Dao | H04L 47/2483 |

OTHER PUBLICATIONS

Wen, Hao, et al. "Droidbot-gpt: Gpt-powered ui automation for android." arXiv preprint arXiv:2304.07061, Jan. 2024, pp. 1-8. (Year: 2024).*

Liu, M. et al., "What It Wants Me To Say": Bridging the Abstraction Gap Between End-User Programmers and Code-Generating Large Language Models, CHI (2023), 31 pgs.

Blackwell, A. F., "SWYN: A visual representation for regular expressions", chapter in Your Wish is My Command: Giving Users the Power to Instruct Their Software, H. Lieberman Ed., Published by Morgan Kaufmann, San Francisco, CA, USA (2001), 18 pgs.

Hirzel, M. "Low-Code Programming Models", arXiv:2205.02282 (2022), 10 pgs.

Harel, D. et al., "Specifying and executing behavioral requirements: the playin/play-out approach", Software & Systems Modeling (2003), vol. 2, pp. 2:82-107.

Pu, K. , et al., "DiLogics: Creating Web Automation Programs With Diverse Logics", arXiv:2308.05828v2 [cs.HC] (2023), 15 pgs.

Lin, J., et al., "End-user programming of mashups with vegemite", IUI (2009), pp. 97-106.

Cypher, A., "Watch What I Do: Programming by Demonstration", http://acypher.com/wwid (1993), 2 pgs.

Sereshkeh, A. R. et al., "VASTA: A Vision and Language-assisted Smartphone Task Automation System", https://arxiv.org/pdf/1911.01474.pdf (2019), 11 pgs.

Li, Y. et al., "Mapping Natural Language Instructions to Mobile UI Action Sequences", https://arxiv.org/pdf/2005.03776.pdf (2020), 13 pgs.

Dong, R. et al., "WebRobot:Web Robotic Process Automation using Interactive Programming-by-Demonstration", https://arxiv.org/pdf/2203.09993 (2022), 16 pgs.

Desmond, M. et al., "A No-Code Low-Code Paradigm for AuthoringBusiness Automations Using Natural Language" https://arxiv.org/pdf/2207.10648 (2022), 8 pgs.

Wang, B. et al., "Enabling Conversational Interaction with Mobile UI using Large Language Models", https://arxiv.org/pdf/2209.08655.pdf (2023), 17 pgs.

ChatGPT, downloaded Feb. 13, 2024 from https://chat.openai.com/auth/login, 1 pgs.

iMacros Learning Hub, downloaded Feb. 13, 2024 from https://community.progress.com/s/products/imacros, 3 pgs.

Gemini, Supercharge your creativity and productivity, downloaded Feb. 13, 2024 from https://gemini.google.com/?hl=en, 2 pgs.

Lau, T. "Programming by demonstration using version space algebra", Kluwer Academic Publishers (2001), 60 pgs. https://homes.cs.washington.edu/~weld/papers/mlj02.pdf.

Krosnick,R. et al., "Understanding the Challenges and Needs of Programmers Writing Web Automation Scripts", IEEE (2021), 9 pgs., https://ieeexplore.ieee.org/stamp/stamp.jsp?tp=&arnumber=9576476.

Semantic UI, User Interface is the language of the web, downloaded Feb. 13, 2024 from https://semantic-ui.com, 10 pgs.

Adept: Useful General Intelligence, A New Way to Use Computers, downloaded Feb. 13, 2024 from https://www.adept.ai, 7 pgs.

Dallum, B., The fastest path to ROI., downloaded Feb. 13, 2024 from https://www.automationanywhere.com, 13 pgs.

Microsoft, Power Automate, A comprehensive, end-to-end cloud automation platform powered by low code and AI, downloaded Feb. 13, 2024 from https://www.microsoft.com/en-us/power-platform/products/power-automate, 8 pgs.

Le, V. et al., "FlashExtract: A Framework for Data Extraction by Examples", https://www.microsoft.com/en-us/research/wp-content/uploads/2016/12/pldi14-flashextract.pdf (2009), 12 pgs.

Leshed, G. et al., "CoScripter: Automating & Sharing How-To Knowledge in the Enterprise", https://www.plunk.org/eben/PublishedPapers/chi-leshed.pdf, (2008), 10 pgs.

Artificial intelligence for the real-world enterprise downloaded Feb. 13, 2024 from https://www.uipath.com 10 pgs.

Sugiura, A. et al., "Internet scrapbook: automating web browsing tasks by demonstration", UIST (1998), 10 pgs.

Little, G. et al., "Koala: capture, share, automate, personalize business processes on the web", CHI 2007 Proceedings (2007), 5 pgs.

Intharah, T. "Learning to Automate GUI Tasks from Demonstration", University College London, Department of Computer Science, London, United Kingdom (2018), 175 pgs.

Nichols, J. et al., "Mobilization by demonstration: using traces to re-author existing web sites", IUI (2008), 10 pgs.

Touvron, H. et al., "Llama 2: Open Foundation and Fine-Tuned Chat Models", arXiv:2307.09288v2 [cs. CL] (2023), 77 pgs.

Krosnick, R. et al., "ParamMacros: Creating UI Automation Leveraging End-User Natural Language Parameterization", IEEE (2022), 10 pgs.

Wang, B. et al., "Screen2words: Automatic mobile ui summarization with multimodal learning", arXiv:2108.03353v1 [cs.HC] (2021), 13 pgs.

Pu, K. et a;. , SemanticOn: Specifying content-based semantic conditions for web automation programs, Association for Computing Machinery (2022), 16 pgs.

* cited by examiner

700

RECEIVE A DEMONSTRATION OF AN AUTOMATION TO BE PERFORMED ON AN APPLICATION 702

DETECT, ON THE APPLICATION, ONE OR MORE OBJECTS AND ONE OR MORE CORRESPONDING LABELS ASSOCIATED WITH THE DEMONSTRATION 704

TRANSFORM THE DEMONSTRATION INTO ONE OR MOREA NATURAL LANGUAGE INSTRUCTIONS 706

SEMANTICALLY SELECTING, DURING A RUNTIME ACTION, AN OBJECT BASED ON A LARGE LANGUAGE MODEL (LLM), THE SEMANTICALLY SELECTING BEING REFLECTIVE OF AN INTENTION CAPTURED IN THE ONE OR MORE NATURAL LANGUAGE INSTRUCTIONS DESPITE ANY CHANGE IN A CORRESPONDING LABEL OF THE OBJECT 708

FIG. 7

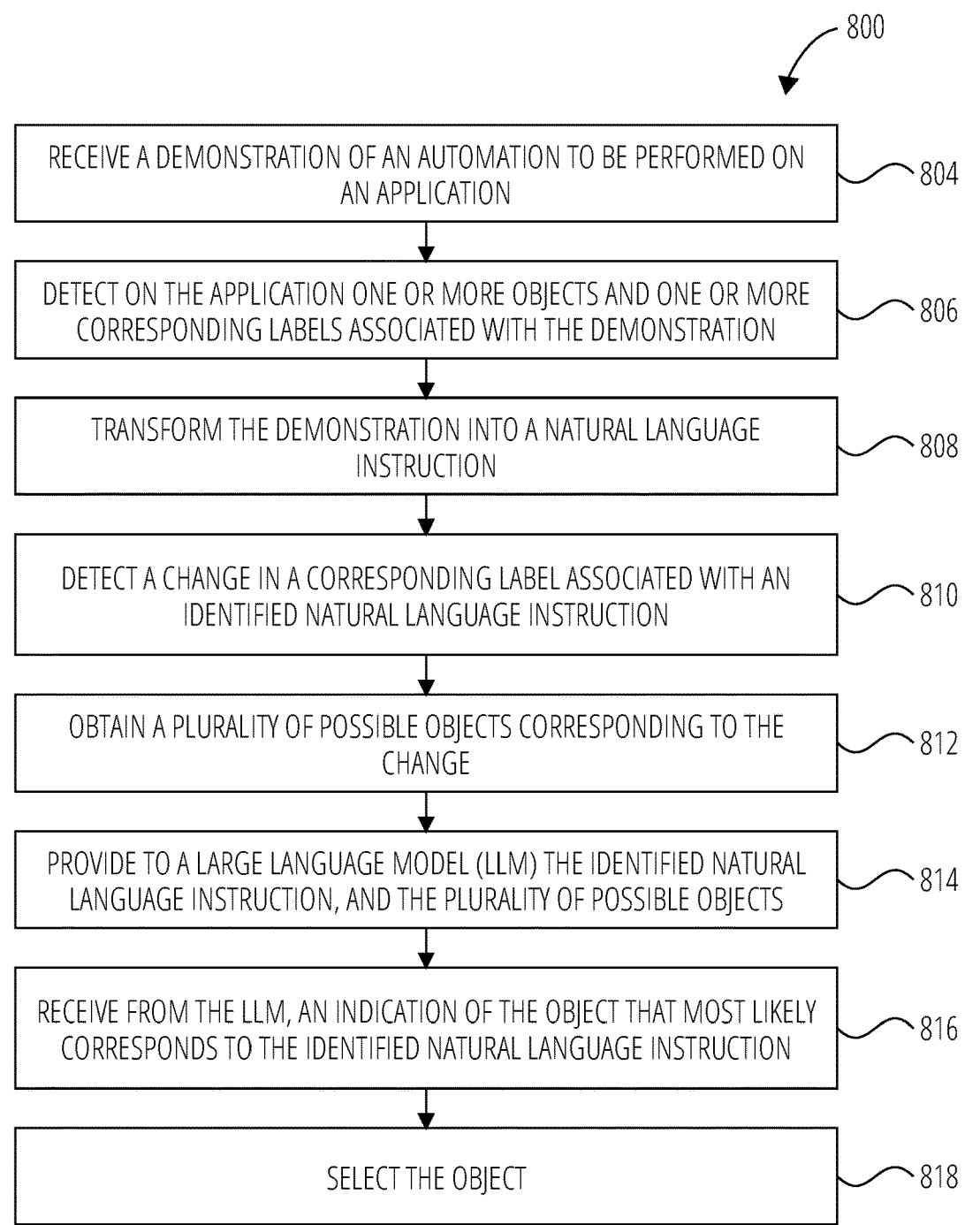

RECEIVE A DEMONSTRATION OF AN AUTOMATION TO BE PERFORMED ON AN APPLICATION — 804

DETECT ON THE APPLICATION ONE OR MORE OBJECTS AND ONE OR MORE CORRESPONDING LABELS ASSOCIATED WITH THE DEMONSTRATION — 806

TRANSFORM THE DEMONSTRATION INTO A NATURAL LANGUAGE INSTRUCTION — 808

DETECT A CHANGE IN A CORRESPONDING LABEL ASSOCIATED WITH AN IDENTIFIED NATURAL LANGUAGE INSTRUCTION — 810

OBTAIN A PLURALITY OF POSSIBLE OBJECTS CORRESPONDING TO THE CHANGE — 812

PROVIDE TO A LARGE LANGUAGE MODEL (LLM) THE IDENTIFIED NATURAL LANGUAGE INSTRUCTION, AND THE PLURALITY OF POSSIBLE OBJECTS — 814

RECEIVE FROM THE LLM, AN INDICATION OF THE OBJECT THAT MOST LIKELY CORRESPONDS TO THE IDENTIFIED NATURAL LANGUAGE INSTRUCTION — 816

SELECT THE OBJECT — 818

FIG. 8

USER INTERFACE AUTOMATION USING NATURAL LANGUAGE

BACKGROUND

Technical Field

The present disclosure generally relates to User Interface Automation, and more particularly, to a method and system of automating user interface using natural language instructions and large language models.

Description of the Related Art

User Interface (UI) automation is an aspect of modern software development and testing processes. UI automation may involve the creation and execution of scripts or code to simulate user interactions with a software application's graphical user interface (GUI). The automation process may aim to improve efficiency, accuracy, and reliability in various tasks such as software testing, repetitive tasks execution, and workflow automation.

The use of UI automation tool may emanate from the complexity and variability of modern software applications. With the proliferation of web, desktop, mobile applications, and other digital platforms, manual testing and repetitive tasks execution can become increasingly time-consuming and error-prone, especially when the UI changes.

UI automation may typically involve interacting with UI elements such as buttons, input fields, dropdown menus, and dialog boxes. This interaction can encompass actions normally performed with a mouse and keyboard. Central to most UI automation tools is the programmatic interaction with the UI elements. This interaction is typically facilitated through automation frameworks and tools to allow for the execution of diverse actions.

UI automation tools are typically used by operators with a deep understanding of UI technologies. Experienced programmers may define stable selector anchors for UI elements in such automation tools, which may sometimes lead to limited scalability and generalization across different applications. Some Low-code and No-Code (LCNC) platforms may provide visual development environments, which may be also limited in flexibility. In essence, though UI automation is a vital part of the software development process, challenges still remain with regards to the availability of robust automation tools that have the capacity to endure a multitude of evolving software scenarios.

BRIEF SUMMARY

According to an embodiment of the present disclosure, a method includes receiving a demonstration of an automation to be performed on an application. One or more objects and one or more corresponding labels that are associated with the demonstration may be detected. The demonstration may be transformed into a natural language instruction. An object is semantically selected during a runtime action based on a large language model (LLM), the semantic selection being reflective of an intention captured in the natural language instruction despite any change in a corresponding label of the object. According to an embodiment, a system includes a processor that receives a demonstration of an automation to be performed on an application. The processor can detect, on the application, one or more objects and one or more corresponding labels associated with the demonstration. The processor then transforms the demonstration into one or more natural language instructions and semantically select, during a runtime action, an object based on a large language model, to reflect an intent of the one or more natural language instructions despite any change in a corresponding label of the object.

According to one embodiment of the present disclosure, a non-transitory computer readable storage medium stores computer-executable instructions that can be executed by a computer system to cause the computer system to receive, a demonstration of an automation to be performed on an application and detect, on the application, one or more objects and one or more corresponding labels associated with the demonstration. The computer is caused to further transform the demonstration into one or more natural language instructions and to semantically select, in a runtime action, an object based on a large language model. The semantic selecting is reflective of an intention captured in the one or more natural language instructions despite any change in a corresponding label of the object.

According to one embodiment of the present disclosure, a method is provided. In the method, a demonstration of an automation to be performed on an application is received. The demonstration is transformed into one or more natural language instructions. An object is then semantically selected, during a runtime action based on a large language model. The semantic selection is reflective of an intention captured in the one or more natural language instructions despite any change in a corresponding label of the object. The automation can further be modified based on a new natural language user input. According to one embodiment of the present disclosure, a system is provided. The system includes a knowledge representation dataset that includes one or more natural language instructions of an automation and a processor. The processor receives the knowledge representation dataset; and semantically selects, during a runtime action of the automation an object based on a large language model (LLM), to reflect an intent of the one or more natural language instructions despite any change in a corresponding label of the object.

In one embodiment, the system receives, a demonstration of an automation to be performed on an application and detects on the application, one or more objects and one or more corresponding labels associated with the demonstration; and transform the demonstration into one or more natural language instructions representative of actions performed on the one or more objects.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 7 illustrates a routine in accordance with one embodiment.

FIG. 8 depicts a method in accordance with an illustrative embodiment.

DETAILED DESCRIPTION

Figure 1:
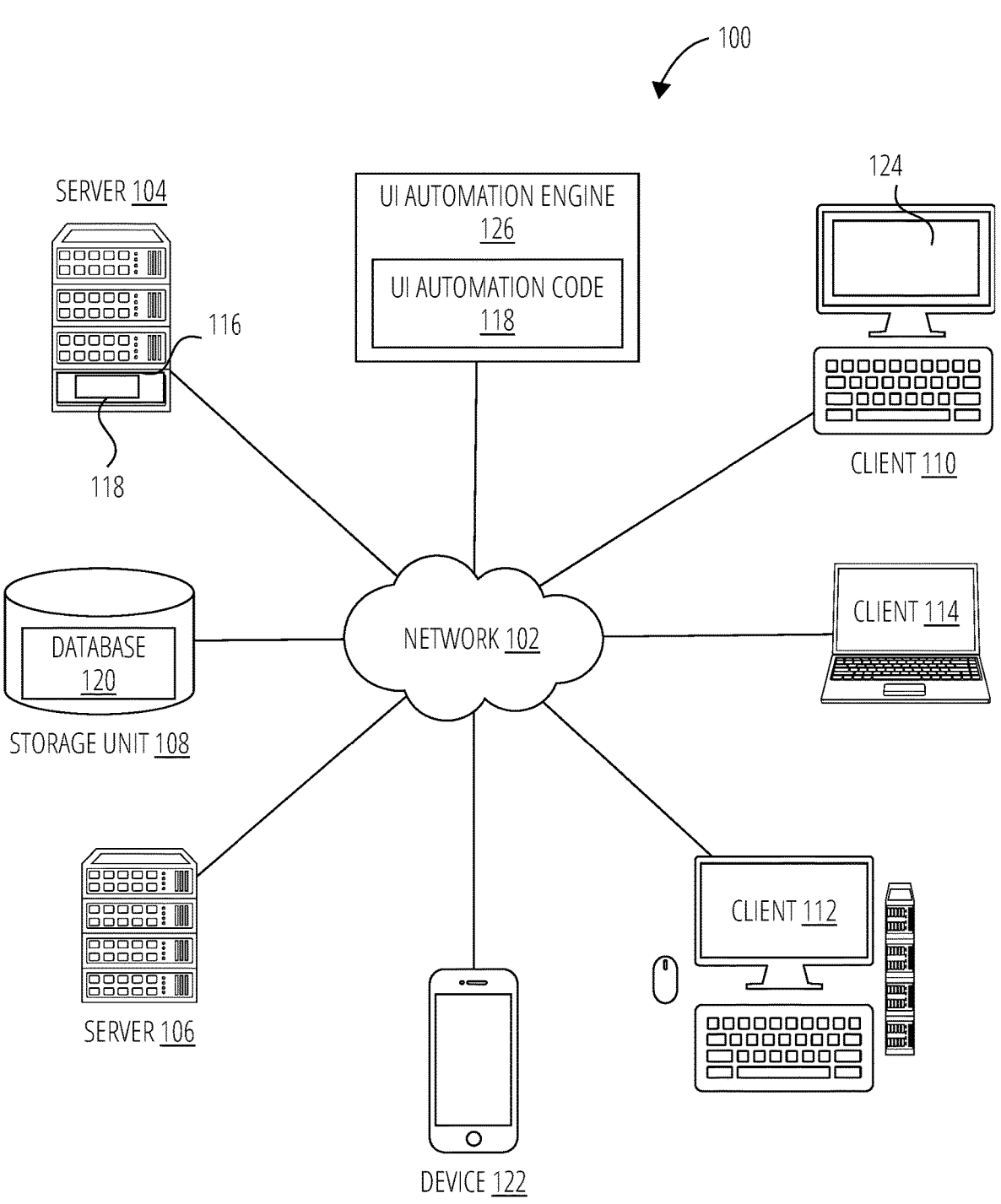
FIG. 1 depicts a block diagram of a network of data processing systems in accordance with an illustrative embodiment.

According to an aspect of the present disclosure, there is provided a method in which a demonstration of an automation to be performed on an application is received. One or more objects and one or more corresponding labels that are associated with the demonstration may be detected. The demonstration may be transformed, using the computing device, into one or more natural language instructions. An object is semantically selected during a runtime action based on a large language model (LLM), the semantic selection being reflective of an intention captured in the natural language instruction despite any change in a corresponding label of the object. This may allow an operator to both teach and run UI automation without any coding or programming skills, thus bringing a unique combination of accessibility, efficiency, scalability, and customization to the field of automation, targeting the specific needs of non-technical business users. The method may thus incorporate semantic programming models, focusing on the meaning or intention behind code rather than its syntax. The abstract approach makes automation more intuitive for users who may not be familiar with technical details. While Low-code and No-code platforms offer customization through visual programming, the method enables end-users to both teach and run UI automation even when UI elements change, providing greater flexibility without sacrificing ease of use.

In embodiments, the automation is performed by PbD (programming by demonstration). The use of PbD may simplify the programming process by allowing operators to demonstrate tasks effectively in a non-technical manner.

In embodiments, the one or more objects and the one or more corresponding labels may be detected by performing a page understanding to generate a dataset representative of an original state of objects available on a page of the application. The page understanding allows the comprehension of a full-page state, including the topology of the UI Elements to analyze the current interactable elements on the page.

In embodiments, the one or more natural language instructions is stored in a knowledge representation dataset including automation workflows that can be rerun during runtime for accelerated and accessible automation.

In embodiments, the semantic selection of the object is achieved by detecting a change in a corresponding label associated with an identified natural language instruction of the one or more natural language instructions. The semantic selection further includes obtaining a plurality of possible objects corresponding to the change and providing to the LLM the identified natural language instruction, and the plurality of possible object. An indication of the object that most likely corresponds to the identified natural language instruction is received from the LLM and that object is selected. This advantageously accounts for changes in the labels of objects due to an ability of the LLM to decipher what object corresponds to the change.

In embodiments, a page understanding is performed to generate a dataset that represents a current state of objects available on a page of the application and the change is detected responsive to performing the page understanding. Advantageously, by detecting a current state of objects on the page, the change in the corresponding labels can be determined based on a comparison to original labels. This can trigger the use of the LLM to detect the object that corresponds to the change and to select that object, providing the effect of a robust automation tool that can withstand changes in objects and thus can be used on a wide variety of applications. By employing the concepts of automation workflows, page understandings, and allowing users to demonstrate tasks that are then executed by an LLM based at least partly on the page understandings, resiliency of UI automation may be achieved.

In embodiments, selecting the object is performed during runtime. Selecting the object during runtime may allow the automation to be replayed on demand.

In embodiments, the demonstration is received during a teaching action. An automation workflow can therefore be dictated by an operator in a desired manner.

In embodiments, the application is a plug-in module that can be plugged into a web, desktop, or mobile application. A modular nature of the plug-in module can allow the automation workflow to be performed on varying types of applications. According to an aspect of the present disclosure, there is provided a system that includes a processor that receives a demonstration of an automation to be performed on an application. The processor can detect, on the application, one or more objects and one or more corresponding labels associated with the demonstration. The processor then transforms the demonstration into one or more natural language instructions and semantically select, during a runtime action, an object based on a large language model, to reflect an intent of the one or more natural language instructions despite any change in a corresponding label of the object. This may allow the use of dedicated systems to teach and run UI automation without any coding or programming skills. A convention programmatic interaction created manual on the system for interactions with the UI elements is thus obviated as the system may now be enabled to create a more durable interaction logic that captures an intent of an operator.

In embodiments, the one or more objects are user interface elements. The user interface elements along with their attributes and metadata can be collected and assigned a unique name for easy identification.

In embodiments, the automation is performed by PbD. PbD can make automation accessible to non-technical operators such that automation systems described herein can be utilized.

In embodiments, the one or more natural language instructions of the system is stored in a knowledge representation dataset. From the knowledge representation dataset, necessary stored natural language instructions for a given task can be retrieved extemporaneously.

In embodiments, the processor can detect, a change in a corresponding label associated with an identified natural language instruction of the one or more natural language instructions; obtain, a number of possible objects corresponding to the change; provide to the LLM the identified natural language instruction, and the plurality of possible objects; receive, from the LLM, an indication of the object that most likely corresponds to the identified natural language instruction; and select the object. Thus, the processor can be an orchestrator that semantically selects a desired object to perform automation.

In embodiments, the demonstration is received during a teaching action. The demonstration can be received via a user-friendly interface for teaching UI automation, which can minimize the need for extensive technical training.

In embodiments of the system, the application is a plug-in module that can be plugged into a web, desktop, or mobile application. The plug-in module can be a modular software component (e.g., plugin, extension, add-on etc., otherwise a module configured to be plug into or be plugged into) for another application can be controlled to perform actions on the application.

According to an embodiment of the present disclosure, there is provided a non-transitory computer-readable storage medium that stores computer-executable instructions, which when executed by a computer system can cause the computer system to: receive, a demonstration of an automation to be performed on an application; detect, on the application, one or more objects and one or more corresponding labels associated with the demonstration; and transform the demonstration into one or more natural language instructions. The non-transitory computer-readable storage medium further stores computer-executable instructions, which when executed by a computer system can cause the computer system to semantically select, in a runtime action, an object based on a large language model (LLM). The semantic selection is reflective of an intention captured in the one or more natural language instructions despite any change in a corresponding label of the object. By storing the computer-executable instructions, intuitive automation modules may be packaged and made more readily available to users who may not be familiar with technical know-how about automation workflows.

In embodiments, the automation is performed by PbD. The use of PbD may simplify the programming process by allowing operators to demonstrate tasks effectively in a non-technical manner.

In embodiments, the one or more natural language instructions are stored in a knowledge representation dataset. The knowledge representation dataset can include a specification of a program that should be executed and can, for example, provide the flow, the name of an application, external parameters, and the instructions that should be performed as part of an automation.

In embodiments, the application is a plug-in module that can be plugged into a web, desktop, or mobile application. The teaching action and the runtime action can be performed based on control of the plug-in module.

In embodiments, to semantically select the object, the computer-executable instructions are configured to detect, a change in corresponding label associated with an identified natural language instruction of the one or more natural language instructions; obtain, a plurality of possible objects corresponding to the change; and provide, to the LLM the identified natural language instruction, and the plurality of possible objects. The computer-executable instructions can receive, from the LLM, an indication of the object that most likely corresponds to the identified natural language instruction; and select the object. Via use of the computer-executable instructions, changes in the labels of objects can be accounted for due to an ability of the LLM to decipher what object corresponds to what change.

According to an aspect of the present disclosure, there is provided a method. In the method, a demonstration of an automation to be performed on an application is received.

The demonstration is transformed into one or more natural language instructions. An object is then semantically selected, during a runtime action based on a large language model. The semantic selection is reflective of an intention captured in the one or more natural language instructions despite any change in a corresponding label of the object. The automation is modified based on a new natural language user input. The ability to modify the demonstration based on a new natural language input allows not just flexibility of automation but an ability for non-technical operators to updates automation flows in an efficient and timely manner.

According to an aspect of the present disclosure, there is provided a system. The system includes a knowledge representation dataset that includes one or more natural language instructions of an automation; and a processor. The processor receives the knowledge representation dataset; and semantically selects, during a runtime action of the automation an object based on a large language model (LLM), to reflect an intent of the one or more natural language instructions despite any change in a corresponding label of the object. This allows automation flows transferred to and executed be executed on multiple systems even if an original automation was performed on a different system.

In the following detailed description, numerous specific details are set forth by way of examples in order to provide a thorough understanding of the relevant teachings. However, it should be apparent that the present teachings may be practiced without such details. In other instances, well-known methods, procedures, and components have been described at a relatively high-level, without detail, in order to avoid unnecessarily obscuring aspects of the present teachings.

The present disclosure generally relates to a method and system of automating user interface using natural language instructions and large language models.

The illustrative embodiments provide a method of automating user interface using natural language instructions and large language models.

Certain operations are described as occurring at a certain component or location in an embodiment. Such locality of operations is not intended to be limiting on the illustrative embodiments. Any operation described herein as occurring at or performed by a particular component, can be implemented in such a manner that one component-specific function causes an operation to occur or be performed at another component, e.g., at a local or remote engine respectively. In one aspect, the method described herein, is implemented to execute on a particularly configured computing device or data processing system and provides substantial advancement of the functionality of that computing device or data processing system by enabling the use of Large Language Models and Natural Language Inputs. Embodiments thus have the capacity to improve the technical field of UI automation by generalizing the process of UI automation targeting the specific needs of non-technical users.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably processed manually by a human user.

Accordingly, one or more of the methodologies discussed herein may obviate a need for advanced coding skills, efficiency, and speed of the non-technical user. This may have the technical effect of reducing computing resources used by one or more devices within the system.

The illustrative embodiments are described with respect to certain types of machines. The illustrative embodiments are also described with respect to other scenes, subjects, measurements, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Example Data Processing Environment

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as clients (client 110, client 112, client 114), UI Automation Engine 126, and device 122, may include data and may have software applications or software tools executing thereon. Server 104 and server 106 may include one or more GPUs (graphics processing units) for statistical analysis or machine learning.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system, which are all within the scope of the illustrative embodiments.

Data processing systems (UI Automation Engine 126, server 104, server 106, client 110, client 112, client 114, and device 122) also represent example nodes in a cluster, partitions, and other configurations suitable for implementing an embodiment.

Server 104, server 106, storage unit 108, client 110, client 112, client 114, device 122, UI Automation Engine 126 may couple to network 102 using wired connections, wireless communication protocols, or other suitable data connectivity. Client 110, client 112 and client 114 may be, for example, personal computers or network computers.

In the depicted example, the servers may provide data, such as boot files, operating system images, and applications to client 110, client 112, and client 114. Client 110, client 112 and client 114 may be clients to servers in this example. Client 110, client 112 and client 114 or some combination thereof, may include their own data, boot files, operating system images, and applications. Data processing environment 100 may include additional servers, clients, and other devices that are not shown. Server 104 may include a server application 116 that may be configured to implement one or more of the functions described herein in accordance with one or more embodiments. Server application 116, client application 124 and/or UI Automation Engine 126 may include UI Automation Code 118 configured for UI automation. In some embodiments, the UI Automation Engine 126 may be or form a part of a server or client described herein.

Device 122 is an example of a device described herein. For example, device 122 can take the form of a smartphone, a tablet computer, a laptop computer, client 110 in a stationary or a portable form, or any other suitable device. Any software application described as executing in another data processing system in FIG. 1 can be configured to execute in device 122 in a similar manner. Any data or information stored or produced in another data processing system in FIG. 1 can be configured to be stored or produced in device 122 in a similar manner. Database 120 of storage unit 108 may store one or more term data samples for computations herein.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 200 includes an example of an environment for the execution of at least some of the computer code involved in performing the inventive methods, such as UI Automation Code 118. In addition to the UI Automation code 118, computing environment 200 includes, for example, Computer 202, wide area network 228 (WAN), end user device 230 (EUD), remote server 232, public cloud 240, and private cloud 236. In this embodiment, Computer 202 includes processor set 204 (including processing circuitry 206 and cache 208), communication fabric 210, volatile memory 212, persistent storage 214 (including operating system 216 and the UI Automation code 118, as identified above), peripheral device set 218 (including user interface (UI) device set 220, storage 222, and Internet of Things (IoT) sensor set 224), and network module 226. Remote server 232 includes remote database 234. Public cloud 240 includes gateway 238, cloud orchestration module 242, host physical machine set 246, virtual machine set 244, and container set 248.

Figure 2:
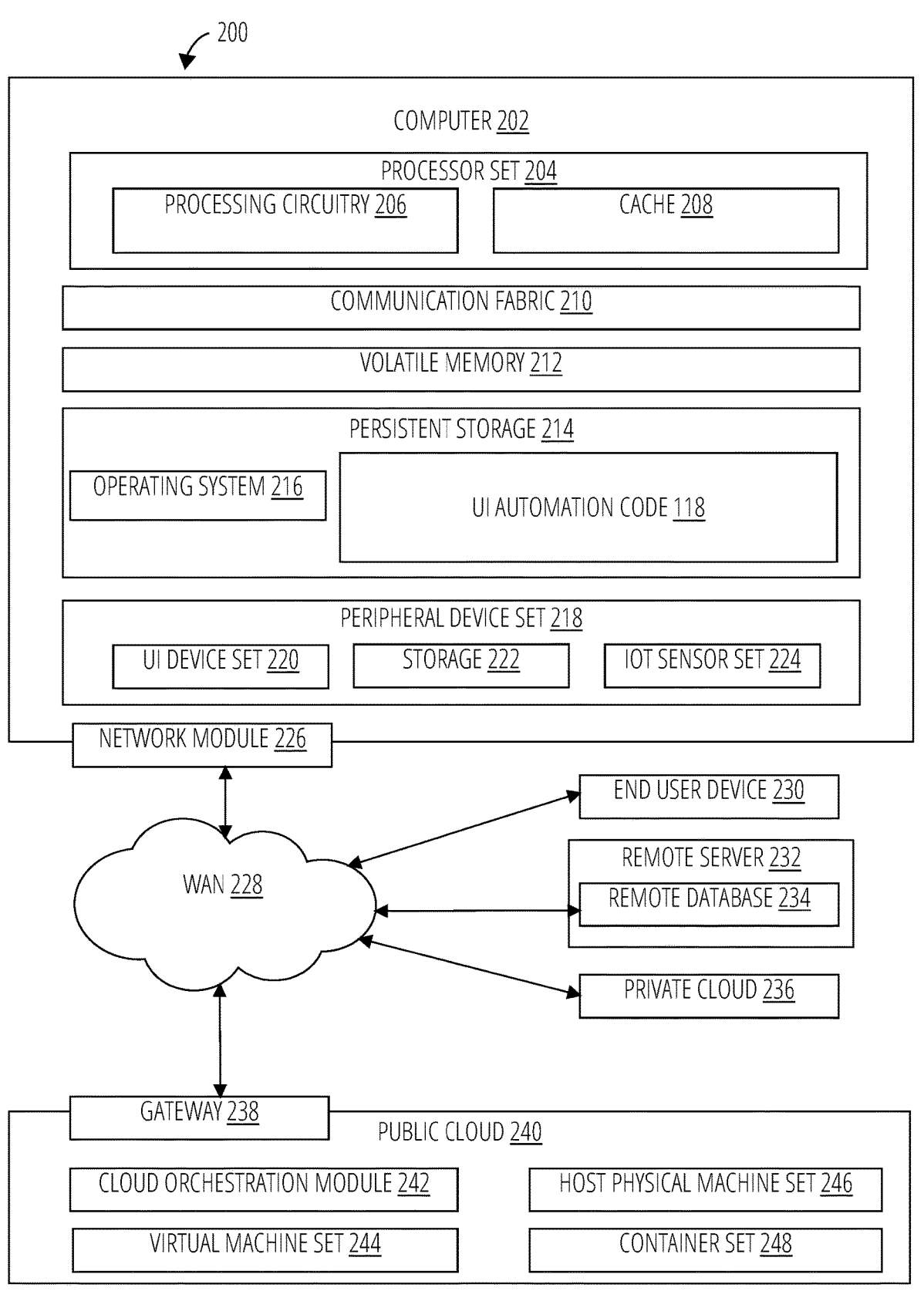
FIG. 2 depicts a block diagram of a computing environment in accordance with an illustrative embodiment.

Computer 202 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 234. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically Computer 202, to keep the presentation as simple as possible. Computer 202 may be located in a cloud, even though it is not shown in a cloud in FIG. 2. On the other hand, Computer 202 is not required to be in a cloud except to any extent as may be affirmatively indicated.

Processor set 204 includes one, or more, computer processors of any type now known or to be developed in the future. Processing circuitry 206 may be distributed over multiple packages, for example, multiple, coordinated integrated circuit chips. Processing circuitry 206 may implement multiple processor threads and/or multiple processor cores. Cache 208 is memory that is located in the processor chip package(s) and is typically used for data or code that should be available for rapid access by the threads or cores running on processor set 204. Cache memories are typically organized into multiple levels depending upon relative proximity to the processing circuitry. Alternatively, some, or all, of the cache for the processor set may be located "off chip."

In some computing environments, processor set 204 may be designed for working with qubits and performing quantum computing.

Computer readable program instructions are typically loaded onto Computer 202 to cause a series of operational steps to be performed by processor set 204 of Computer 202 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 208 and the other storage media discussed below. The program instructions, and associated data, are accessed by processor set 204 to control and direct performance of the inventive methods. In computing environment 200, at least some of the instructions for performing the inventive methods may be stored in the UI Automation code 118 in persistent storage 214.

Communication fabric 210 is the signal conduction path that allows the various components of Computer 202 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In Computer 202, the volatile memory 212 is located in a single package and is internal to Computer 202, but, alternatively or additionally, the volatile memory may be distributed over multiple packages and/or located externally with respect to Computer 202.

Persistent storage 214 is any form of non-volatile storage for computers that is now known or to be developed in the future. The non-volatility of this storage means that the stored data is maintained regardless of whether power is being supplied to Computer 202 and/or directly to persistent storage 214. Persistent storage 214 may be a read only memory (ROM), but typically at least a portion of the persistent storage allows writing of data, deletion of data and re-writing of data. Some familiar forms of persistent storage include magnetic disks and solid-state storage devices. Operating system 216 may take several forms, such as various known proprietary operating systems or open-source Portable Operating System Interface-type operating systems that employ a kernel. The code included in the UI Automation code 118 typically includes at least some of the computer code involved in performing the inventive methods.

Peripheral device set 218 includes the set of peripheral devices of Computer 202. Data communication connections between the peripheral devices and the other components of Computer 202 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 220 may include components such as a display screen, speaker, microphone, wearable devices (such as goggles and smart watches), keyboard, mouse, printer, touchpad, game controllers, and haptic devices. Storage 222 is external storage, such as an external hard drive, or insertable storage, such as an SD card. Storage 222 may be persistent and/or volatile. In some embodiments, storage 222 may take the form of a quantum computing storage device for storing data in the form of qubits. In embodiments where Computer 202 is required to have a large amount of storage (for example, where Computer 202 locally stores and manages a large database) then this storage may be provided by peripheral storage devices designed for storing very large amounts of data, such as a storage area network (SAN) that is shared by multiple, geographically distributed computers. IoT sensor set 224 is made up of sensors that can be used in Internet of Things applications. For example, one sensor may be a thermometer and another sensor may be a motion detector.

Network module 226 is the collection of computer software, hardware, and firmware that allows Computer 202 to communicate with other computers through WAN 228. Network module 226 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 226 are performed on the same physical hardware device. In other embodiments (for example, embodiments that utilize software-defined networking (SDN)), the control functions and the forwarding functions of network module 226 are performed on physically separate devices, such that the control functions manage several different network hardware devices. Computer readable program instructions for performing the inventive methods can typically be downloaded to Computer 202 from an external computer or external storage device through a network adapter card or network interface included in network module 226.

WAN 228 is any wide area network (for example, the internet) capable of communicating computer data over non-local distances by any technology for communicating computer data, now known or to be developed in the future. In some embodiments, the WAN 228 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 230 is any computer system that is used and controlled by an end user (for example, a customer of an enterprise that operates Computer 202) and may take any of the forms discussed above in connection with Computer 202. EUD 230 typically receives helpful and useful data from the operations of Computer 202. For example, in a hypothetical case where Computer 202 is designed to provide a recommendation to an end user, this recommendation would typically be communicated from network module 226 of Computer 202 through WAN 228 to EUD 230. In this way, EUD 230 can display, or otherwise present, the recommendation to an end user. In some embodiments, EUD 230 may be a client device, such as thin client, heavy client, mainframe computer, desktop computer and so on.

Remote server 232 is any computer system that serves at least some data and/or functionality to Computer 202.

Remote server 232 may be controlled and used by the same entity that operates Computer 202. Remote server 232 represents the machine(s) that collect and store helpful and useful data for use by other computers, such as Computer 202. For example, in a hypothetical case where Computer 202 is designed and programmed to provide a recommendation based on historical data, then this historical data may be provided to Computer 202 from remote database 234 of remote server 232.

Public cloud 240 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 240 is performed by the computer hardware and/or software of cloud orchestration module 242. The computing resources provided by public cloud 240 are typically implemented by virtual computing environments that run on various computers making up the computers of host physical machine set 246, which is the universe of physical computers in and/or available to public cloud 240. The virtual computing environments (VCEs) typically take the form of virtual machines from virtual machine set 244 and/or containers from container set 248. It is understood that these VCEs may be stored as images and may be transferred among and between the various physical machine hosts, either as images or after instantiation of the VCE. Cloud orchestration module 242 manages the transfer and storage of images, deploys new instantiations of VCEs and manages active instantiations of VCE deployments. Gateway 238 is the collection of computer software, hardware, and firmware that allows public cloud 240 to communicate through WAN 228.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 236 is similar to public cloud 240, except that the computing resources are only available for use by a single enterprise. While private cloud 236 is depicted as being in communication with WAN 228, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 240 and private cloud 236 are both part of a larger hybrid cloud.

Example Architecture

Figure 3:
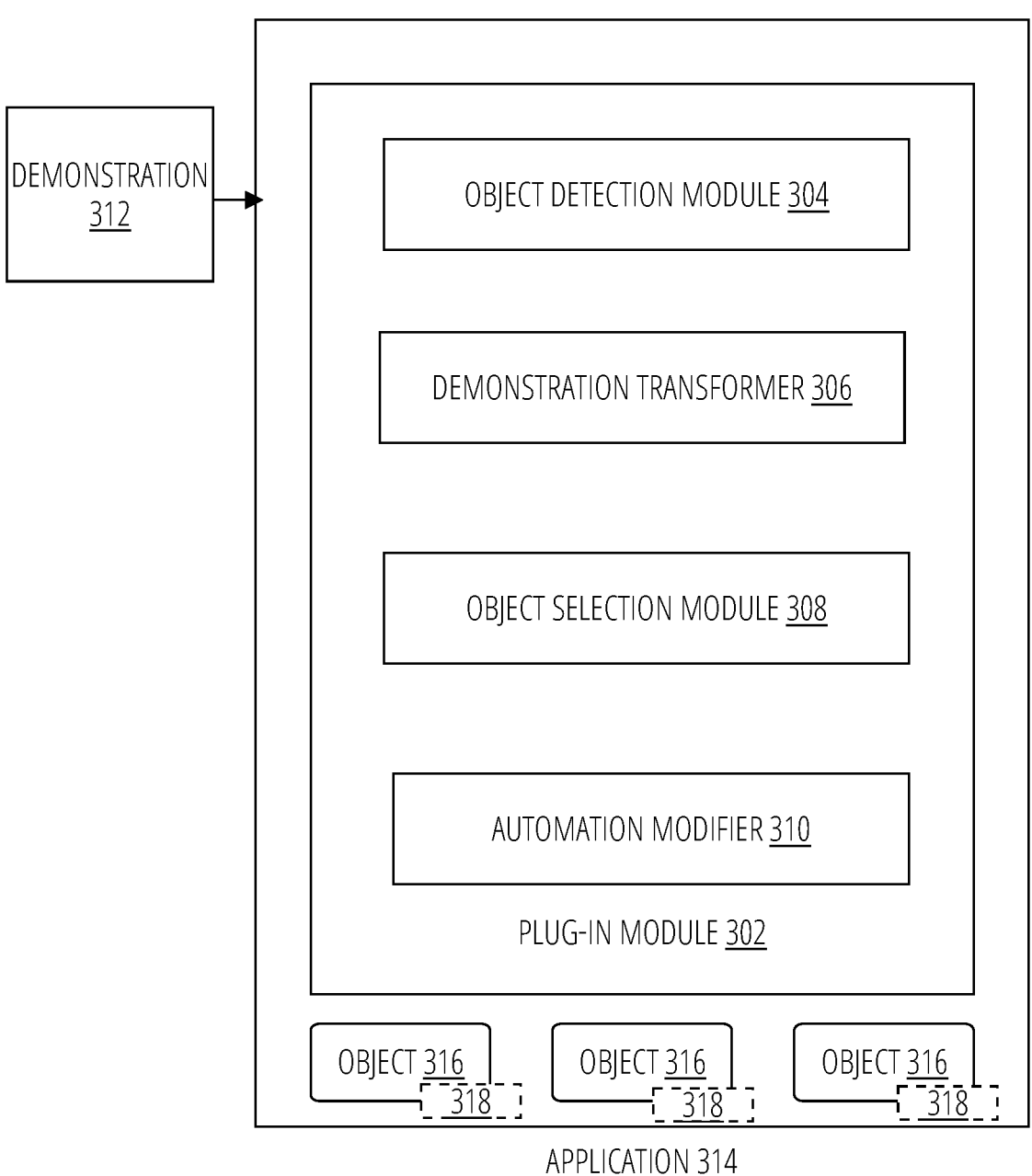
FIG. 3 depicts a block diagram of the architecture of an application in accordance with an illustrative embodiment.

Reference now is made to FIG. 3, which illustrates an architecture of a first and second application configured as an application 314 on which a UI automation may be performed, and as a plug-in module 302 respectively. The plug-in module 302 may and the application 314 may be operated based on UI Automation code 118 or UI automation engine 126 to perform UI automation. The plug-in module may further include or operate an object detection module 304, a demonstration transformer 306, an object selection module 308, and an automation modifier 310 as discussed herein. The plug-in module 302 may perform or be controlled by a controller to perform one or more operations described herein. In an embodiment, the plug-in module 302 may be deployed as a modular software component (e.g., plugin, extension, add-on etc., otherwise a module configured to be plugged into) for a web-browser. However, the plug-in module 302 may alternatively be associated with other applications such as a desktop application, mobile application, or other application on which UI automation can be performed. Therefore, even though a web application may be specified, this is not meant to be limiting as other applications 314 may be realized in view of the descriptions.

Figure 4A:
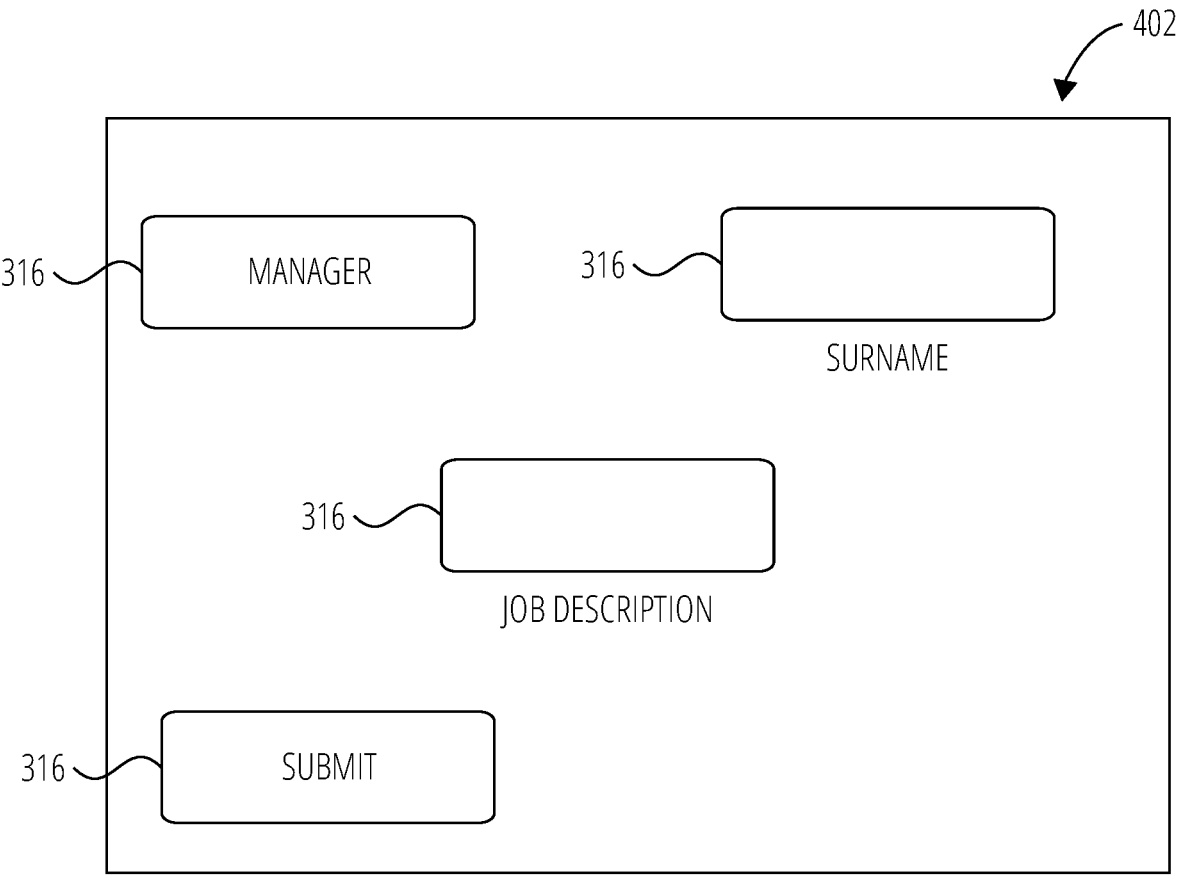
FIG. 4A depicts a block diagram of a page of an application in accordance with an illustrative embodiment.
Figure 4B:
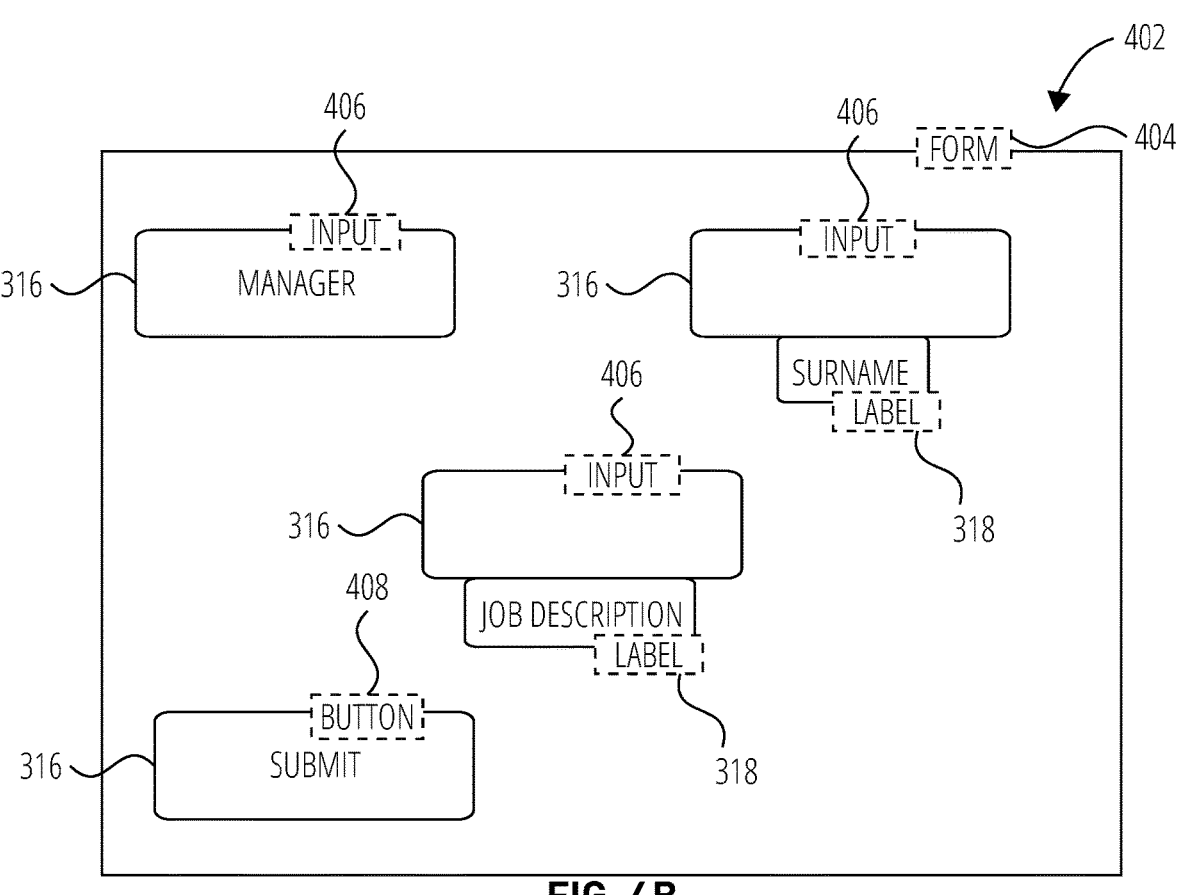
FIG. 4B depicts a block diagram visualizing a page understanding of an application in accordance with an illustrative embodiment.

During a teaching phase in which a teaching action is performed on the application 314 associated with the plug-in module 302, a demonstration 312 of an automation workflow is performed to generate an automation workflow which may comprise actions that a rerun of the automation should perform. The object detection module 304 may perform a page understanding of a page of the application 314 wherein an analysis of objects 316 on the page (i.e. interactable elements or UI elements such as inputs, outputs, buttons, forms etc.), and their corresponding labels is performed to capture an original state of the page, including the topology of the object 316. For example, as seen in the exemplary embodiments of FIG. 4A-FIG. 4B, a page 402 may comprise objects 316 as shown in FIG. 4A that may be classified, in the visualized page understanding of FIG. 4B as, for example, inputs 406, outputs (not shown), forms 404 or buttons 408. The corresponding labels 318 of the objects 316 may also be shown. The page understanding helps to analyze the interactable elements on a page by comprehending the full-page state, including the topology of the UI elements. The page understanding may help to identify the functional role of each element of the page 402, which, in turn, helps the automation system described herein to select the element correctly. A page understanding algorithm may be used for the page understanding and may be rules-based, wherein each rule may represent either a topology group or an interactable element. Elements from the page may be collected based on a current rule and composed or grouped together based on their relation in a model that illustrates the structure of objects 316 on the application 314, for example based on their relation in an HTML DOM (HyperText Markup Language Document Object Model) file.

According to an illustrative embodiment, heuristics of a current page can be used to generate a list of all objects 316 on the current page. Objects 316 and their corresponding labels 318 can then be combined based on reference attributes and position information. In an embodiment, the page understanding is performed using not only DOM based techniques but also pixel-wise proximity logic. Element hierarchies such as lists, groups, and forms may then be constructed and a full textual (or visual) representation of the page 402 with a unique name for each of the plurality of object 316 displayed.

Referring back to FIG. 3, the object detection module 304 may detect, on the application 314, one or more objects 316 and one or more corresponding labels 318 associated with the demonstration 312. In other aspects, the object detection module 304 may alternatively or in addition detect the one or more objects 316 and the one or more corresponding labels 318 via natural language input. Further, the object detection module 304 may validate the one or more objects 316 and the one or more corresponding labels 318 with the user to establish an accuracy of the detection.

Further, the demonstration transformer 306 may transform the demonstration 312 into one or more natural language instructions. In an embodiment, the natural language instruction may be further stored in a knowledge representation dataset comprising one or more workflows of the automation in a knowledge representation database. Thus, a knowledge representation database may comprise a plurality of automation workflows or knowledge representation datasets that can be rerun during runtime for automation purposes.

During a runtime phase in which a runtime action is performed on the application 314 associated with the plug-in module 302, the object selection module 308 may semantically select an object 316 based on an LLM. More specifically, a semantic selection that is reflective of an intention captured in the stored natural language instructions may be performed to select the right object during runtime despite any change in a corresponding label of the object.

To semantically select the object, the object selection module 308 may detect perform a new page understanding to detect a current state of objects 316 in the page. The object selection module 308 then obtains a plurality of possible objects 316 corresponding to an identified natural language instruction of the automation. The object selection module 308 may further provide the identified natural language instruction, and the plurality of possible objects 316 to the LLM. Responsive to the provision, the object selection module 308 receives from the LLM, the object 316 that corresponds to or most likely corresponds to the identified flow. The object selection module 308 may the select the object 316 during runtime.

In another aspect, in case there is a need for an operator to modify a stored automation workflow by the user, the automation modifier 310 may receive a natural language input for use in modify the stored natural language instructions. The modification can be performed to update, replace, or add one or more instructions to the automation workflow.

Figure 5:
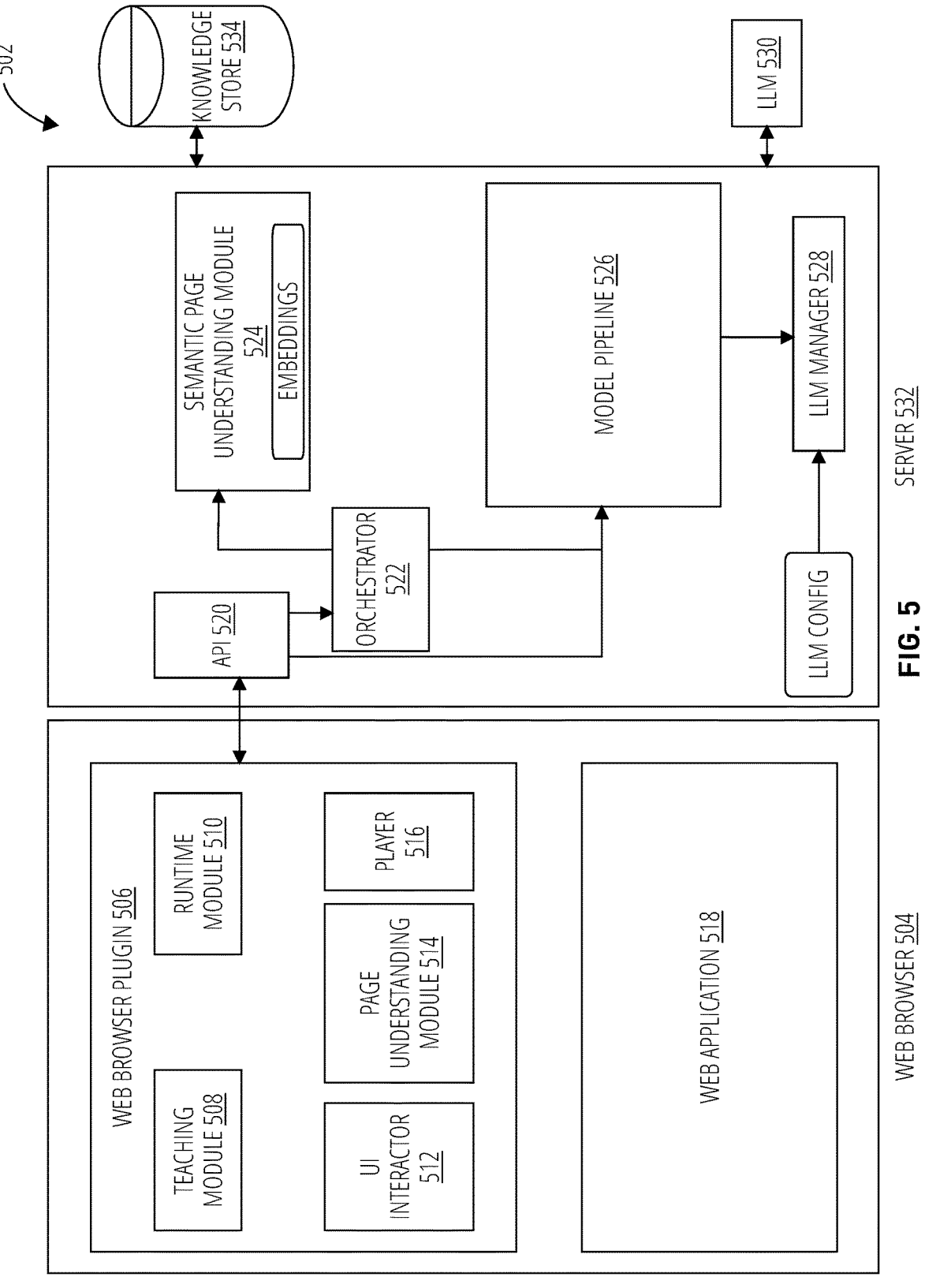
FIG. 5 depicts a block diagram of the architecture of a system with an illustrative embodiment.

FIG. 5 illustrates a block diagram of a UI automation system 502 in accordance with an illustrative embodiment. The UI automation system 502 includes a web browser 504, a server 532, a knowledge store 534, and an LLM 530 communicably coupled to each other via an Application Programming Interface (API 520).

The web browser 504 may include a web browser plugin 506, and a web application 518. The web browser plugin 506 may include a teaching module 508, a runtime module 510, a UI interactor 512, a page understanding module 514, and a player 516. In an embodiment, the UI interactor 512 be a tool or library that configured to simulate user interactions with a graphical user interface. In an embodiment, the page understanding module 514 analyzes and comprehends the structure, elements, and behavior of a user interface of the web-application.

Further, the server 532 be an example of server 104 or server 106 and may include a controller, herein referred to as an orchestrator 522 that control or perform one or more actions described herein. The server 532 further includes a semantic page understanding module 524, a model pipeline 526, and an LLM manager 528. In an embodiment, the orchestrator 522 is designed to automate and execute various teaching and runtime actions. In an aspect, the orchestrator 522 is communicatively coupled to the knowledge store 534, such as database 120 of FIG. 1, which serves as a repository for the knowledge representation datasets. This allows the orchestrator 522 to retrieve the necessary stored natural language instructions for a given task. The orchestrator 522 may also be communicatively linked to the semantic page understanding module 524 and the LLM manager 528. The orchestrator may follow a systematic approach, using the semantic page understanding module 524 and runtime module 510, during runtime execution of stored automation workflows. During a teaching phase however, the orchestrator 522 may engage the teaching module 508 and the page understanding module 514 to generate a page understanding of the page 402.

When an operator intends to play an existing automation, the operator may begin by sending a natural language utterance that may trigger a workflow, e.g. (log a call). The orchestrator 522 then retrieves the relevant workflow (knowledge representation dataset) comprising one or more natural language instructions for the task from the knowledge store 534. In an aspect, the orchestrator 522 employs the model pipeline 526 to perform a Named Entity Recognition (NER), a natural language processing (NLP) method that extracts information from text to map the utterance of the operator to the parameters of the workflow. For each identified natural language instruction within the workflow, a state analysis from the semantic page understanding module 524 may be computed. This process involves the collection of all matching objects 316 on the page 402. Further, a search of these objects 316 to determine which object 316 corresponds to the identified natural language instruction is computed by providing the objects 316 and the natural language instruction to the LLM 530 via the LLM manager 528, which aids in selecting the most appropriate element from the screen based on the context and the instruction. Finally, the orchestrator 522 engages the player 516 to select the object 316 that has been identified by the LLM 530. This comprehensive process ensures that each flow step is performed precisely, aligning closely with the need of the user and the specifics of the web page being interacted with.

In some cases, the process may be similar in the teaching phase. For instance, if the operator types, "click on Home", the orchestrator 522 may perform a task such as NER, called generalize instruction, to break down the natural language instruction into several parts, such as the action "CLICK", the element name "HOME", and any parameters. The orchestrator 522 may trigger a semantic page understanding, perform a similarity search, and feed the output to the LLM pipeline to choose the correct object 316. The action is then performed to receive feedback from an operator about an accuracy of the action.

Figure 6:
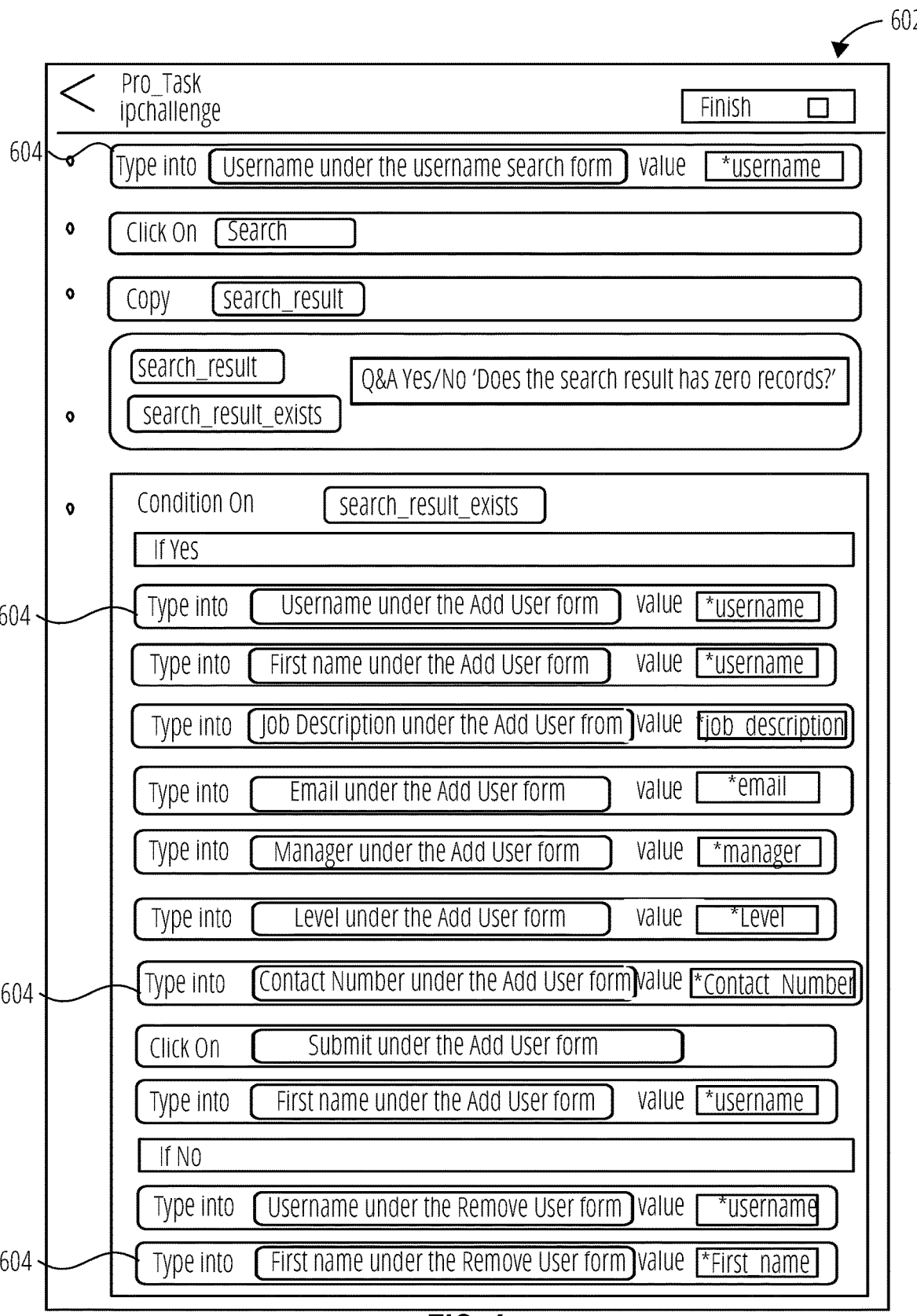
FIG. 6 depicts a block diagram visualizing natural language instructions in accordance with an illustrative embodiment.

Turning now to FIG. 6, a visualized automation workflow 602 comprising natural language instructions 604 in accordance with an illustrative embodiment. In an embodiment, automation workflow is a knowledge representation dataset that includes a specification of the program that should be executed. It may include sample utterances that may trigger the flow, the name of the application, external parameters, and the instructions that should be performed as part of the automation (such as click, type, type-submit, navigate, copy, paste, smart Q&A, conditional instructions, etc.). For instructions that interact with UI elements on the screen, the information may include UI action type (e.g., click, type, type-submit, etc.), name of the UI element (e.g., advanced search), parameter/variable/reference/constant, mandatory or optional which means only if the user provided referred to it in the utterance.

In an exemplary embodiment, the workflow may include knowledge documents that may be serialized as YAML files. Further, the sample utterances (sentences) may be transformed into embeddings and stored in a vector store, alongside the YAML files and additional metadata such as the application name. Before storing the specific sample utterances, they may be processed to represent more generic utterances, e.g. by replacing specific entities with their generic types (e.g. John Doe may be transformed to Person Name).

Turning now to FIG. 7, a routine for UI automation is disclosed in accordance with an illustrative embodiment. In block 702, UI Automation engine 126 receives a demonstration of an automation to be performed on an application 314. In block 704, UI Automation engine 126 detects, on the application 314, one or more objects 316 and one or more corresponding labels 318 associated with the demonstration. In block 706, UI Automation engine 126 transforms the demonstration into one or more natural language instructions.

In block 708, UI Automation engine 126 semantically selects, during a runtime action, an object based on a large language model (LLM). The semantic selection is reflective of an intention captured in the one or more natural language instructions despite any change in a corresponding label of the object 316.

Turning now to FIG. 8, another routine 800 for UI automation is disclosed in accordance with an illustrative embodiment. In block 804, UI Automation engine 126 may receive a demonstration of an automation to be performed on an application. In an embodiment, the application may be a web application. In an embodiment, the automation may be performed by PbD (programming by demonstration). In an embodiment, the demonstration may be received during a teaching phase. In block 806, UI Automation engine 126 may detect, on the application, one or more objects 316 and one or more corresponding labels 318 associated with the demonstration. In block 808, UI Automation engine 126 may transform the demonstration into one or more natural language instructions 604. In an embodiment, the natural language instruction 604 may be stored in a knowledge representation dataset or workflow. In block 810, UI Automation engine 126 may detect a change in a corresponding label 318 associated with an identified natural language instruction 604. In block 812, UI automation engine 126 may obtain a plurality of possible objects corresponding to the change. In block 814, UI Automation engine 126 may provide to the LLM the identified natural language instruction, and the plurality of possible objects. In block 816, UI Automation engine 126 may receive, from the LLM, an indication of the object 316 that corresponds to or most likely corresponds to the identified natural language instruction. In block 818, UI Automation engine 126 may select the object during a runtime action based on the LLM.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits, and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method, comprising:
receiving, by a computing device, during a teaching phase of an automation, a demonstration of the automation to be performed on an application;
detecting, on the application, during the teaching phase of the automation, objects and labels associated with the demonstration, wherein each object of the objects is associated with a corresponding label of the labels;
transforming, by the computing device, during the teaching phase of the automation, the demonstration into natural language instructions based on the detecting of the objects and the labels;
storing the natural language instructions in a knowledge representation dataset; and
semantically selecting, during a runtime phase of the automation, an object of the objects based on a large language model (LLM), wherein the semantically selecting of the object comprises:
detecting a change in the corresponding label of the object, wherein the changed corresponding label is associated with a natural language instruction of the stored natural language instructions;
obtaining a plurality of possible objects among the objects, wherein the obtained plurality of possible objects corresponds to the changed corresponding label;
providing, to the LLM, the natural language instruction and the obtained plurality of possible objects;
receiving, from the LLM, an indication of the object that most likely corresponds to the natural language instruction among the obtained plurality of possible objects; and
selecting the object based on the receiving of the indication of the object, wherein
the semantically selecting is reflective of an intention captured in the natural language instruction of the stored natural language instructions, despite the change in the corresponding label of the object.

2. The computer-implemented method of claim 1, wherein the automation is performed by PbD (programming by demonstration).

3. The computer-implemented method of claim 1, further comprising:
detecting the objects and the labels by performing a page understanding of a page of the application to generate a dataset representative of an original state of the objects available on the page of the application.

4. The computer-implemented method of claim 1, further comprising:
performing a page understanding on a page of the application to generate a dataset representative of a current state of the objects available on the page of the application; and
detecting the change in the corresponding label of the object based on the performing of the page understanding.

5. The computer-implemented method of claim 1, wherein the application is a plug-in module configured to be plugged into a web, a desktop, or a mobile application.

6. A system, comprising:
a processor configured to:
receive, during a teaching phase of an automation, a demonstration of the automation to be performed on an application;

detect, on the application, during the teaching phase of the automation, objects and labels associated with the demonstration, wherein each object of the objects is associated with a corresponding label of the labels;

transform, during the teaching phase of the automation, the demonstration into natural language instructions based on the detection of the objects and the labels;

store the natural language instructions in a knowledge representation dataset; and semantically select, during a runtime phase of the automation, an object of the objects based on a large language model (LLM), wherein the semantic selection of the object comprises:

detection of a change in the corresponding label of the object, wherein the changed corresponding label is associated with a natural language instruction of the stored natural language instructions;

obtainment of a plurality of possible objects among the objects, wherein the obtained plurality of possible objects corresponds to the changed corresponding label;

provision, to the LLM, of the natural language instruction and the obtained plurality of possible objects;

reception, from the LLM, of an indication of the object that most likely corresponds to the natural language instruction among the obtained plurality of possible objects; and selection of the object based on the reception of the indication of the object, wherein the semantic selection is reflective of an intent of the natural language instruction of the stored natural language instructions, despite the change in the corresponding label of the object.

7. The system of claim 6, wherein the detected objects are user interface elements.

8. The system of claim 6, wherein the automation is performed by PbD (programming by demonstration).

9. The system of claim 6, wherein the application is a plug-in module configured to be plugged into a web, a desktop, or a mobile application.

10. A non-transitory computer-readable storage medium storing computer-executable instructions, which when executed by a computer system causes the computer system to:

receive, during a teaching phase of an automation, a demonstration of the automation to be performed on an application;

detect, on the application, during the teaching phase of the automation, objects and labels associated with the demonstration, wherein each object of the objects is associated with a corresponding label of the labels;

transform, during the teaching phase of the automation, the demonstration into natural language instructions based on the detection of the objects and the labels;

store the natural language instructions in a knowledge representation dataset; and semantically select, during a runtime phase of the automation, an object of the objects based on a large language model (LLM), wherein the semantic selection of the object comprises:

detection of a change in the corresponding label of the object, wherein the changed corresponding label is associated with a natural language instruction of the stored natural language instructions;

obtainment of a plurality of possible objects among the objects, wherein the obtained plurality of possible objects corresponds to the changed corresponding label;

provision, to the LLM, of the natural language instruction and the obtained plurality of possible objects;

reception, from the LLM, of an indication of the object that most likely corresponds to the natural language instruction among the obtained plurality of possible objects; and selection of the object based on the reception of the indication of the object wherein the semantic selection is reflective of an intention captured in the natural language instruction of the stored natural language instructions, despite the change in the corresponding label of the object.

11. The non-transitory computer-readable storage medium of claim 10, wherein the automation is performed by PbD (programming by demonstration).

12. The non-transitory computer-readable storage medium of claim 10, wherein the application is a plug-in module configured to be plugged into a web, a desktop, or a mobile application.

13. A computer-implemented method, comprising:

receiving, by a computing device, during a teaching phase of an automation, a demonstration of the automation to be performed on an application;

transforming, by the computing device, during the teaching phase of the automation, the demonstration into natural language instructions;

storing the natural language instructions in a knowledge representation dataset;

semantically selecting, during a runtime phase of the automation, an object of objects associated with the demonstration based on a large language model (LLM), wherein the semantically selecting of the object comprises:

detecting a change in a label of the object, wherein the changed label is associated with a natural language instruction of the stored natural language instructions;

obtaining a plurality of possible objects among the objects, wherein the obtained plurality of possible objects corresponds to the changed label;

providing, to the LLM, the natural language instruction and the obtained plurality of possible objects;

receiving, from the LLM, an indication of the object that most likely corresponds to the natural language instruction among the obtained plurality of possible objects; and selecting the object based on the receiving of the indication of the object, wherein the semantically selecting is reflective of an intention captured in the natural language instruction of the stored natural language instructions, despite the change in the label of the object; and modifying the automation based on a new natural language user input.

14. The computer-implemented method of claim 13, wherein the modifying of the automation is performed to update, replace, or add one or more natural language instructions to the automation.

15. A system, comprising:

a knowledge representation dataset comprising natural language instructions of an automation; and a processor configured to:

receive the knowledge representation dataset; and semantically select, during a runtime phase the automation, an object of objects based on a large language model (LLM), wherein the semantic selection of the object comprises:

detection of a change in a label of the object, wherein the changed label is associated with a natural language instruction of the natural language instructions;

obtainment of a plurality of possible objects among the objects, wherein the obtained plurality of possible objects corresponds to the changed label;

provision, to the LLM, of the natural language instruction and the obtained plurality of possible objects;

reception, from the LLM, of an indication of the object that most likely corresponds to the natural language instruction among the obtained plurality of possible objects; and selection of the object based on the reception of the indication of the object, wherein the semantic selection is reflective of an intent of the natural language instruction of the natural language instructions, despite the change in the label of the object.

16. The system of claim 15, wherein the processor is further configured to:

receive, during a teaching phase of the automation, a demonstration of the automation to be performed on an application;

detect, on the application, during the teaching phase of the automation, the objects and labels associated with the demonstration, wherein each object of the objects is associated with a corresponding label of the labels; and transform, during the teaching phase of the automation, the demonstration into the natural language instructions representative of the automation to be performed on the application.

\* \* \* \* \*